(12) United States Patent
Burford et al.

(10) Patent No.: US 9,565,645 B1
(45) Date of Patent: Feb. 7, 2017

(54) METHOD FOR A SMALL CELL TO WIRELESSLY CONNECT TO A GRANDMASTER TIMING DEVICE

(71) Applicant: Sprint Communications Company L.P., Overland Park, KS (US)

(72) Inventors: Henry Burford, Leesburg, VA (US); Eric C. English, Lee's Summit, MO (US); Seng Gan, Ashburn, VA (US); Khoi Dinh Nguyen, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 197 days.

(21) Appl. No.: 14/452,027

(22) Filed: Aug. 5, 2014

(51) Int. Cl.
*H04W 56/00* (2009.01)
*H04L 7/00* (2006.01)
*H04L 29/12* (2006.01)

(52) U.S. Cl.
CPC ........ *H04W 56/0015* (2013.01); *H04L 7/0008* (2013.01); *H04L 61/2007* (2013.01); *H04W 56/001* (2013.01); *H04W 56/002* (2013.01); *H04W 56/006* (2013.01)

(58) Field of Classification Search
CPC ........... H04W 56/0015; H04W 56/001; H04W 56/002; H04W 56/006; H04L 7/0008; H04L 61/2007
USPC .............. 370/310, 315, 316, 319, 321, 324, 328,370/345, 350, 351, 389, 395.1, 395.6, 395.61,370/395.62, 498, 503, 464, 509; 455/39, 500, 455/501, 502
See application file for complete search history.

(56) References Cited

U.S. PATENT DOCUMENTS

| | | | |
|---|---|---|---|
| 2010/0067507 A1* | 3/2010 | Park ...................... | H04J 3/0638 370/338 |
| 2011/0103337 A1* | 5/2011 | Bryant ..................... | G04G 7/02 370/329 |
| 2012/0243529 A1* | 9/2012 | Sumikawa .............. | G01S 19/14 370/350 |
| 2013/0005326 A1* | 1/2013 | Flanagan .............. | H04W 36/04 455/422.1 |
| 2013/0079048 A1* | 3/2013 | Cai ........................ | H04W 48/16 455/517 |
| 2015/0222413 A1* | 8/2015 | Pietilainen ................ | G06F 1/14 709/248 |

* cited by examiner

*Primary Examiner* — Obaidul Huq

(57) ABSTRACT

Methods for wirelessly connecting a small cell to a grandmaster timing device are disclosed. The methods can include identifying one or more grandmaster timing devices and wirelessly requesting an IP address to enable a small cell to connect to a grandmaster timing device for time synchronization. The methods may further include selecting a grandmaster timing device based on a predetermined preference order that includes a relative preference level for different types of grandmaster timing devices.

19 Claims, 8 Drawing Sheets ically 1
METHOD FOR A SMALL CELL TO WIRELESSLY CONNECT TO A GRANDMASTER TIMING DEVICE

SUMMARY

A high level overview of various aspects of the invention is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief, and at a high level, this disclosure describes, among other things, methods for wirelessly connecting a small cell to a grandmaster timing device. For instance, in one embodiment, a small cell can identify one or more grandmaster timing devices, where each of the grandmaster timing devices may be communicatively coupled to a wireless communication component. In this embodiment, the small cell can select one of the grandmaster timing devices that have been identified and request an IP address from that grandmaster timing device to enable the small cell to wirelessly connect to that grandmaster timing device for time synchronization. As explained herein, this allows for a grandmaster timing device to provide timing information to one or more small cells without the need to physically connect the small cells to the grandmaster timing device.

BRIEF DESCRIPTION OF THE DRAWINGS

Illustrative embodiments of the present invention are described in detail below with reference to the attached drawing figures, and wherein.

DETAILED DESCRIPTION

Figure 1:
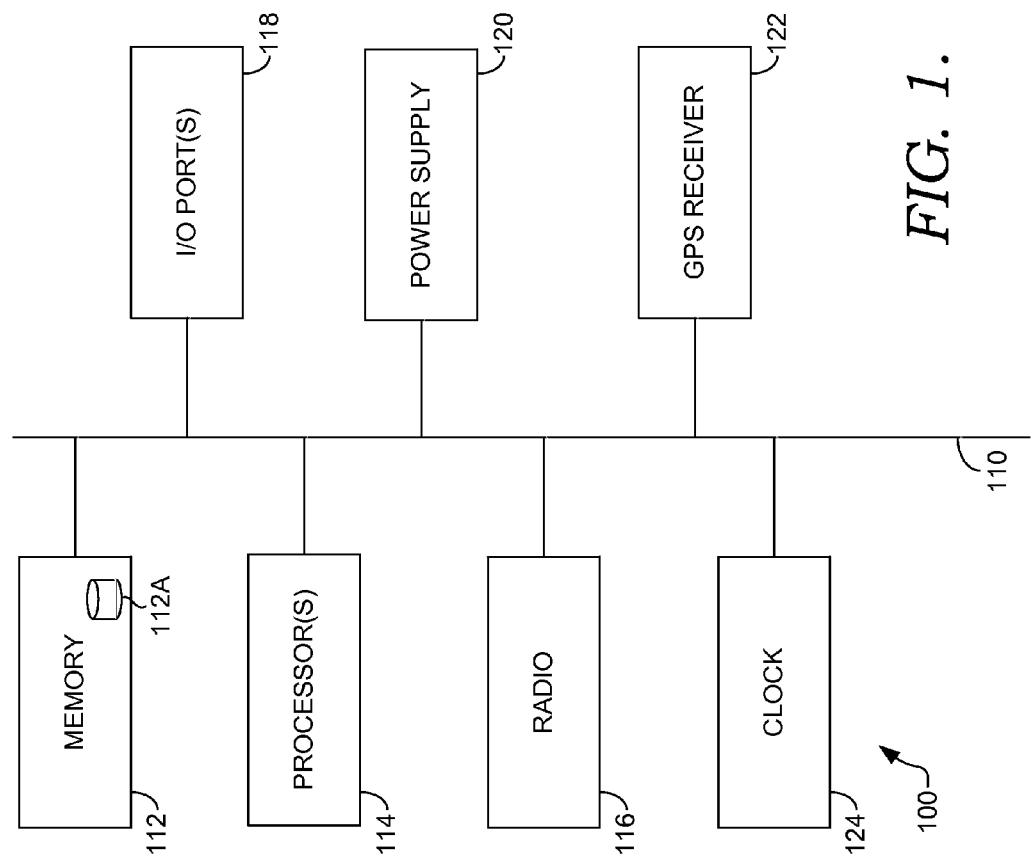
FIG. 1 depicts an exemplary computing device, according to an embodiment of the present invention.

The subject matter of select embodiments of the present invention is described with specificity herein to meet statutory requirements. However, the description itself is not intended to define what we regard as our invention, which is what the claims do. The claimed subject matter might be embodied in other ways to include different steps or combinations of steps similar to the ones described in this document, in conjunction with other present or future technologies. Moreover, although the term "step" might be used herein to connote different elements of the methods employed, this term should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CDMA Code Division Multiple Access
TDMA Time Division Multiple Access
LTE Long Term Evolution
LTE-A Long Term Evolution Advanced
GSM Global System for Mobile Communications
GPS Global Positioning System
IP Internet Protocol
LCIB Low-Cost Internet Base Station
PTP Precision Time Protocol Further, various technical terms are used throughout this description. An illustrative resource that fleshes out various aspects of these terms can be found in Newton's Telecom Dictionary, 27th Edition (2012).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To address gaps in macro-network coverage (e.g., in buildings), to provide additional network capacity in congested areas, and for other reasons, macro-network service providers may install devices referred to herein as small cells, which may also be referred to as femtocells, picocells, microcells, low-cost internet base stations (LCIBs), and by other names.

A small cell must maintain strict packet timing, such as that required by 4G/LTE systems. When a plurality of small cells is deployed within a facility, the timing requirements become even tighter. In that case, clock synchronization between the small cells is essential to facilitate handoff from one small cell to the next as a user moves within the facility.

In typical macro-network implementations, Global Positioning System (GPS) receivers are installed at every macro base station for clock frequency and phase synchronization. But in the case of small cell deployment, synchronization can be problematic. Locating small cells with GPS accessibility is not always possible. For example, in an installation where signals from the macro-network cannot penetrate a building, it may be desirable to install small cells. These small cells would also require synchronization, and with GPS unable to penetrate the building, the use of Precision Time Protocol becomes a cost effective means of providing synchronization. Additionally, deploying each small cell with a GPS receiver may be cost prohibitive.

Precision Time Protocol (PTP) IEEE-1588v2 provides a means for frequency and phase synchronization of clocks throughout a network. In simplified terms, in a PTP system, a grandmaster timing device sends PTP frames/packets to a slave clock (such as that associated with a small cell) which are time stamped. The term "grandmaster timing device" as used herein refers to a device that performs the functions of a grandmaster clock, and may include devices and/or components that are dedicated to grandmaster clock functions, as well as devices and/or components that perform functions in addition to grandmaster clock functions. The grandmaster timing device may be located at or within the facility that houses the small cells, or may be located elsewhere. The slave clock uses the sync packets to accurately track the grandmaster clock and synchronize its internal clock with the grandmaster clock. The term slave clock, as used herein, refers to a device that performs the functions of a slave clock, and may include devices and/or components that are dedicated to slave clock functions, as well as devices and/or components that perform functions in addition to slave clock functions.

In typical small cell deployments, the small cells can connect and communicate with a grandmaster timing device via an Ethernet connection. However, providing a wired Ethernet connection between a grandmaster timing device and one or more small cells can be laborious and costly. For this and other reasons, it would be advantageous to be able to wirelessly connect small cells to a grandmaster timing device for time synchronization. Further, it would be beneficial if one or more small cells can chose which grandmaster timing device to connect with so that these small cells can synchronize to the most desirable and/or the most accurate grandmaster timing device.

Embodiments of the present invention relate to systems, methods, and computer-readable media for, among other things, wirelessly synchronizing one or more slave clocks associated with one or more small cells with a grandmaster clock associated with a grandmaster timing device. Utilizing embodiments hereof, wirelessly synchronizing one or more small cells with a grandmaster timing device can facilitate the strict timing requirements of certain telecommunication networks, such as an LTE network, so that a user's mobile device may be transferred from one small cell to another small cell as the user moves about. The wireless synchronization can include selecting a grandmaster timing device and transmitting a request for an IP address.

Accordingly, in one aspect, the present invention is directed to a method for wirelessly connecting a small cell to a grandmaster timing device. The method includes identifying one or more grandmaster timing devices, where each of the one or more grandmaster timing devices includes a grandmaster clock communicatively coupled to a wireless communication component. In addition, the method includes selecting a first grandmaster timing device from the one or more grandmaster timing devices and wirelessly transmitting, from the small cell to the first grandmaster timing device, a request for an IP address to enable the small cell to wirelessly connect to the first grandmaster timing device for time synchronization.

In another aspect, the present invention is directed to a method for wirelessly connecting a small cell to a grandmaster timing device. The method includes identifying one or more grandmaster timing devices, each of the one or more grandmaster timing devices including a grandmaster clock communicatively coupled to: 1) a GPS receiver; and 2) a wireless communication component. Further, the method includes selecting a first grandmaster timing device from the one or more grandmaster timing devices based on a predetermined preference order, the predetermined preference order being at least partly based on the proximity of a GPS receiver to a grandmaster clock for each of the one or more grandmaster timing devices. In addition, the method includes wirelessly transmitting a request for an IP address to the first grandmaster timing device to enable a small cell to wirelessly connect to the first grandmaster timing device for time synchronization.

In yet another aspect, the present invention includes a method for wirelessly connecting a small cell to a grandmaster timing device. The method includes receiving, from a small cell, a request for an IP address and determining, at a grandmaster timing device, if the grandmaster timing device has capacity to connect to the small cell. In addition, the method includes wirelessly transmitting an IP address from the grandmaster timing device to the small cell to enable the small cell to wirelessly connect to the grandmaster timing device for time synchronization.

Turning now to FIG. 1, a block diagram of an illustrative computing device according to one embodiment is provided and referenced generally by the numeral 100. In embodiments, the computing device 100 can represent a grandmaster timing device or a small cell. As illustratively shown, the computing device 100 can include a bus 110 that directly or indirectly couples various components together including memory 112, a processor 114, a radio 116, input/output (I/O) ports 118, a power supply 120, a GPS receiver 122, and a clock 124. Although some components of the computing device 100 are shown in the singular, they may be plural. For example, the computing device 100 might include multiple processors or multiple radios, etc. In embodiments, one or more of the components can be excluded from the computing device 100. For example, in embodiments when the computing device 100 includes a small cell, such a computing device 100 may not include the GPS receiver 122.

In certain embodiments not depicted in FIG. 1, the radio 116 and/or the GPS receiver 122 may be connected to the computing device 100 via an I/O port 118, as opposed to being connected via the bus 110. For example, in embodiments where the computing device 100 represents a grandmaster timing device, the computing device 100 can include a GPS receiver 122 that may be connected via a bus (as illustrated in FIG. 1) or may be connected via an I/O port 118, such as via a GPS cable. In certain embodiments, where the GPS receiver 122 is coupled to the grandmaster timing device via a GPS cable, the GPS receiver 122 can be located at a position spaced apart from the grandmaster timing device. For example, in such embodiments, the GPS receiver 122 can be positioned on the roof of a building while the grandmaster timing device can be positioned inside the building. In one or more embodiments, a GPS receiver 122 can be coupled to more than one grandmaster timing device via a GPS cable. In another example, a GPS receiver 122 may be associated with another grandmaster timing device, e.g., via a bus connection, and yet, that GPS receiver 122 may be coupled to a different grandmaster timing device via a GPS cable.

The memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 112A that, when executed, facilitate various aspects disclosed herein. These embodied instructions will variously be referred to as "instructions" or an "application" for short. The processor 114 might actually be multiple processors that receive instructions and process them accordingly.

In embodiments where the computing device 100 includes a small cell, one or more radios 116 can facilitate communication with a wireless-telecommunications network. Illustrative wireless telecommunications technologies include CDMA, GPRS, TDMA, GSM, WiMax, LTE, and the like. In some embodiments, the radio 116 might also facilitate other types of wireless communications including Wi-Fi communications and GIS communications. As can be appreciated, in various embodiments, the radio 116 can be configured to support multiple technologies and/or multiple radios can be utilized to support a technology or multiple technologies.

In embodiments where the computing device 100 includes a grandmaster timing device comprising a wireless communication component, one or more of the radios 116, connected via the bus 110, can facilitate wireless communications, e.g., via the IEEE 802.11 standard or a low power, short range wireless communication technology. In alternative embodiments, when the computing device 100 includes a grandmaster timing device comprising a wireless communication component, the computing device 100 may not have a radio 116 connected via a bus 110; instead, the wireless communication component may be connected via the I/O port 118 and may facilitate wireless communications, e.g., via the IEEE 802.11 standard or a low power, short range wireless communication technology.

Input/output port 118 might take on a variety of forms. Illustrative input/output ports include a USB jack, stereo jack, infrared port, proprietary communications ports, and the like. In embodiments not depicted in the figures, the computing device 100 can include a power supply such as a plug connection to a power source, batteries, fuel cells, or any other component that can act as a power source to power the computing device 100.

In certain embodiments, the clock 124 can include a grandmaster clock associated with a grandmaster timing device. In such embodiments, the grandmaster clock can be any commercially available grandmaster clock. In alternative embodiments, the clock 124 can include a slave clock associated with a small cell. In such embodiments, the slave clock can be any commercially available clock associated with a small cell.

Figure 2:
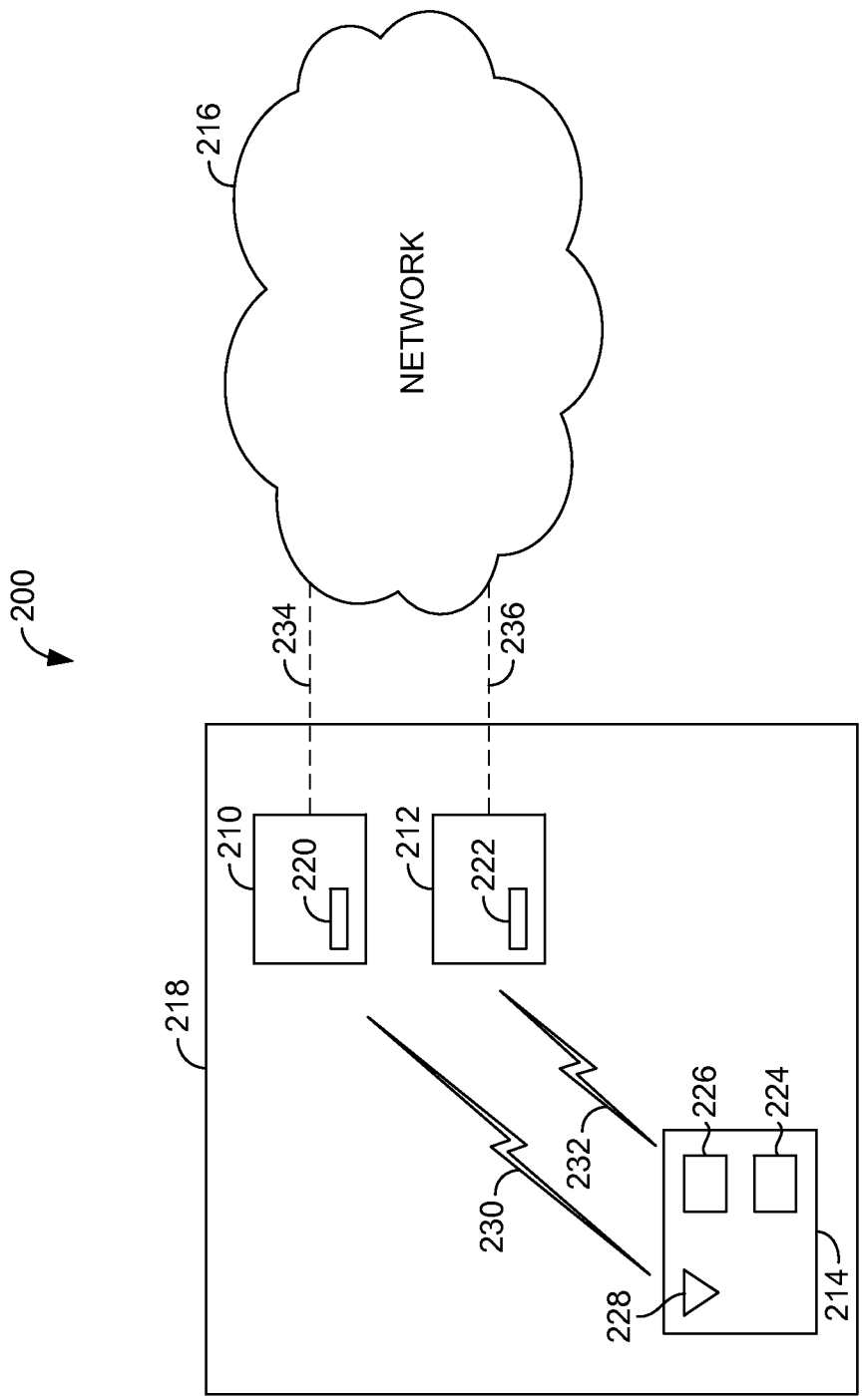
FIG. 2 depicts a network environment having two small cells in wireless communication with a grandmaster timing device, according to an embodiment of the present invention.

Turning now to FIG. 2, an exemplary network environment 200 is depicted. The network environment 200 of FIG. 2 can include one or more small cells, e.g., the small cells 210 and 212, and one or more grandmaster timing devices, e.g., the grandmaster timing device 214, all positioned inside a building 218. In alternative embodiments, one or both small cells 210 and 212, and/or the grandmaster timing device 214, can be positioned outside the building 218. While the network environment 200 of FIG. 2 includes a building 218, it will be appreciated that the present invention can work in any location where the deployment of small cells is desired, such as in urban canyons or other environments. In addition, small cells may be deployed in areas of high network congestion.

The small cells 210 and 212 can be any type of small cell known to one skilled in the art, such as the types of small cells discussed above, e.g., femtocells, picocells, and microcells, or other types of small cells that perform similar functions. The small cells 210 and 212 depicted in FIG. 2 can be the same or different types of small cells.

As depicted in FIG. 2, the small cells 210 and 212 comprise a slave clock 220 and 222, respectively. As used herein, the term "slave clock" refers to any device capable of performing the functions of synchronizing a clock with a reference clock. While the slave clocks 220 and 222 of FIG. 2 are depicted as being in the same physical device as the small cells 210 and 212, respectively, in alternative embodiments, a slave clock, e.g., the slave clock 220, does not need to be part of the same physical device as the corresponding small cell, e.g., the small cell 210.

The small cells 210 and 212 can be connected to the network 216 via the network connections 234 and 236, respectively. The network connections 234 and 236 can be any type of wired or wireless network connections known to one skilled in the art. For example, the network connections 234 and/or 236 may be a wired connection to the nearest base station, a direct landline connection, or any type of wireless connection. In an embodiment not depicted in the figures, a network aggregation site router may be utilized to connect the small cells 210 and 212 to the network 216.

The network 216 is not limited to a particular type of network or protocol. A non-limiting list of possible networks and protocols can include LTE, LTE-A, IPv4, IPv6, GSM, GPRS, UMTS, and WiMAX.

The grandmaster timing device 214 depicted in FIG. 2 can include a grandmaster clock 224 communicatively coupled to a wireless communication component 226 and a GPS receiver 228. In embodiments, the grandmaster timing device 214 can include any or all of the properties discussed above with reference to the computing device 100 depicted in FIG. 1. The grandmaster timing device 214 can be any type of commercially available grandmaster timing device as long as such device is capable of being communicatively coupled to a wireless communication component, e.g., the wireless communication component 226.

The wireless communication component 226 can be communicatively coupled to the grandmaster timing device 214 in any manner known to one skilled in the art. For example, as discussed above with reference to FIG. 1, a wireless communication component, e.g., the wireless communication component 226, can be coupled to the grandmaster timing device 214 via an I/O port.

The wireless communication component 226 can be any commercially available wireless communication component or device that is capable of wirelessly communicating with a small cell, e.g., the small cells 210 and 212. In certain embodiments, the wireless communication component 226 can be configured to communicate using an IEEE 802.11 standard or using a low power, short range wireless communication technology.

In embodiments, the grandmaster clock 224 of the grandmaster timing device 214 can be synchronized with a GPS timing reference signal, which is received via the GPS receiver 228. The GPS receiver 228 of FIG. 2 is depicted as a component within the physical structure of the grandmaster timing device 214 to schematically represent the GPS receiver 228 being communicatively coupled to the grandmaster timing device 214 via a bus, such as that depicted in the computing device 100 of FIG. 1. In alternative embodiments, as discussed above, the GPS receiver 228 may be communicatively coupled to the grandmaster timing device 214 via a GPS cable or other coupling mechanisms known in the art.

In one or more embodiments, the small cells 210 and 212 may wirelessly identify the grandmaster timing device 214 via the wireless signals 230 and 232, respectively. In such embodiments, as discussed below, the small cells 210 and 212 may wirelessly detect or identify, e.g., via one or more wireless signals 230 and 232, a service set identifier (SSID) associated with the wireless communication component 226 of the grandmaster timing device 214.

In certain embodiments, the grandmaster timing device 214 can wirelessly transmit PTP sync packets at a specified rate to the small cells 210 and 212, via the wireless signals 230 and 232, respectively. In certain embodiments, the PTP slave rates may include at least about 1, 2, 4, 8, 16, 32, 64, or 128 packets per second. As discussed above, the received PTP sync packets can enable the small cells 210 and 212 to synchronize to the grandmaster timing device, which is synchronized to the GPS timing reference. In embodiments, once the small cells 210 and 212 are synchronized, a user having a mobile device can move around a location, e.g., the building 218, and that mobile device will receive properly timed data when moving from the range of one of the small cells 210 and 212 to the range of the other of the small cells 210 and 212. In one or more embodiments, the synchronization via PTP sync packets can include one or more of frequency synchronization, phase synchronization, and time of day synchronization.

Figure 3:
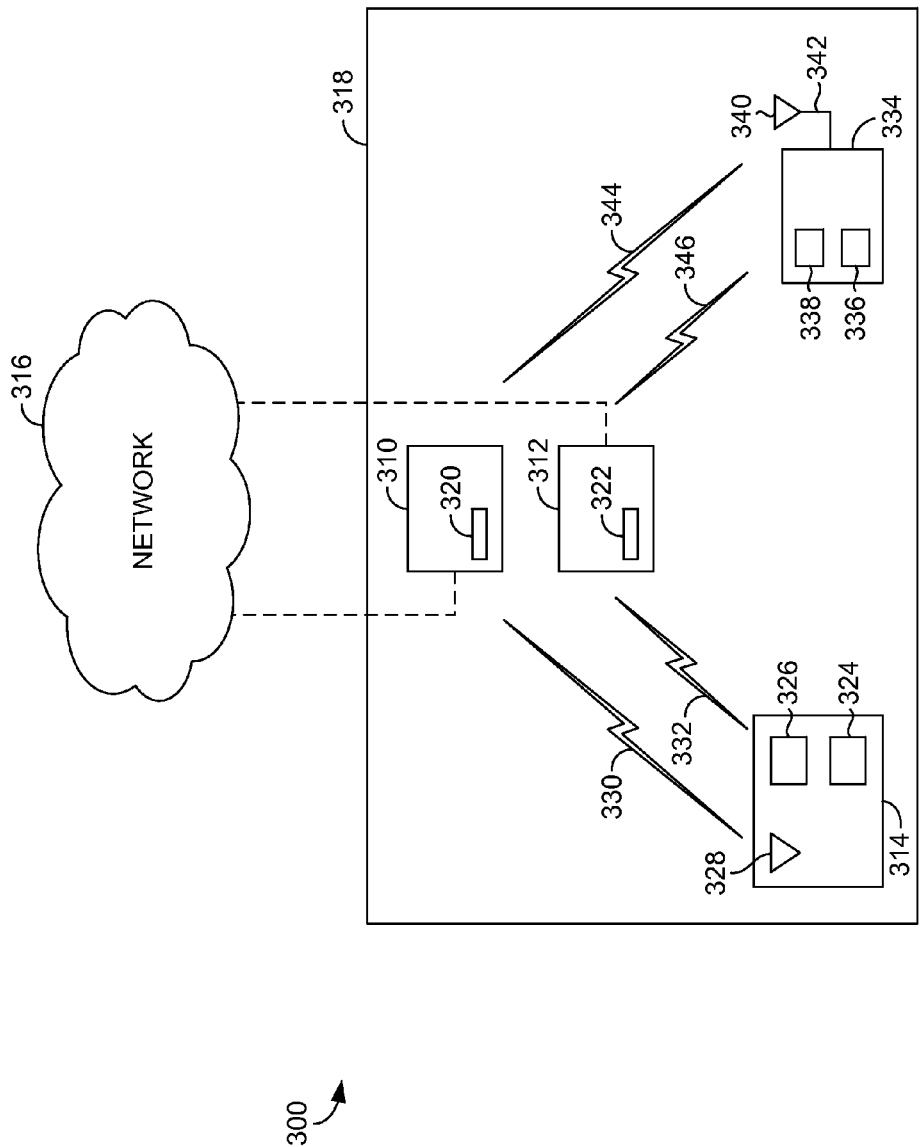
FIG. 3 depicts another network environment having two small cells and two grandmaster timing devices, where the two small cells are in wireless communication with one of the grandmaster timing devices, according to an embodiment of the present invention.

Turning now to FIG. 3, a network environment 300 having two small cells 310 and 312 is depicted. The small cells 310 and 312 can have the same properties and parameters as the small cells 210 and 212 discussed above with reference to FIG. 2. For example, the small cells 310 and 312 can be connected to the network 316 in a wired or wireless manner, as discussed above with reference to FIG. 2. The network 316 can have the same properties and parameters as the network 216 of FIG. 2.

The network environment 300 can include at least two grandmaster timing devices 314 and 334. The grandmaster timing devices 314 and 334 can have the same parameters and properties as the grandmaster timing device 214 discussed above with reference to FIG. 2. For example, the grandmaster timing device 314 can include a GPS receiver 328, a grandmaster clock 324, and a wireless communication component 326. Similarly, the grandmaster timing device 334 can include a GPS receiver 340, a grandmaster clock 336, and a wireless communication component 338.

In the embodiment depicted in FIG. 3, the GPS receiver 328 is depicted as a component within the physical structure of the grandmaster timing device 314 to schematically represent the GPS receiver 328 being communicatively coupled to the grandmaster timing device 314 via a bus, like the grandmaster timing device 214 of FIG. 2. The GPS receiver 340 of the grandmaster timing device 334 is spaced apart from the physical structure of the grandmaster timing device 334 to schematically represent that the GPS receiver 340 is coupled thereto via a GPS cable connection 342.

As can be seen in the embodiment depicted in FIG. 3, the small cells 310 and 312, and the grandmaster timing devices 314 and 334 are located within a building 318. In certain embodiments, one or more of the small cells 310 and 312, and the grandmaster timing devices 314 and 334 can be located outside the building 318.

In one or more embodiments, the small cells 310 and 312 may wirelessly identify the grandmaster timing device 314 via the wireless signals 330 and 332, respectively. In such embodiments, one or more of the wireless signals 330 and 332 may include an SSID associated with the wireless communication component 326 of the grandmaster timing device 314, which may be detected or identified by the small cells 310 and/or 312. In addition, in embodiments, the small cells 310 and 312 may wirelessly identify the grandmaster timing device 334 via the wireless signals 344 and 346, respectively. In such embodiments, one or more of the wireless signals 344 and 346 may include an SSID associated with the wireless communication component 338 of the grandmaster timing device 334, which may be detected or identified by the small cells 310 and/or 312.

As will be discussed further below, the small cells 310 and 312 can select which grandmaster timing device 314 or 334 to attempt to connect to for synchronization based on a predetermined preference order, which can be at least partially based on the proximity of a GPS receiver to a grandmaster clock of a grandmaster timing device. As used herein, the proximity of a GPS receiver to a grandmaster clock of a grandmaster timing device refers to the level of communication latency associated with the manner in which the GPS receiver is coupled to the grandmaster clock of the grandmaster timing device. In embodiments, the predetermined preference order can include giving preference to grandmaster timing devices having a GPS receiver communicatively coupled thereto in a manner with the least communication latency. For instance, a grandmaster timing device communicatively coupled to a GPS receiver via a bus, e.g., the grandmaster timing device 314, may be preferred over a grandmaster timing device coupled to a GPS receiver via a GPS cable connection, e.g., the grandmaster timing device 334, as a bus connection has a reduced communication latency compared to a GPS cable connection.

In the embodiment depicted in FIG. 3, the small cells 310 and 312 have selected to attempt to connect to the grandmaster timing device 314. Upon a successful connection, the grandmaster timing device 314 sends PTP sync packets via the wireless connections 330 and 332 to the small cells 310 and 312, respectively. In such embodiments, after receiving the PTP sync packets, the slave clocks 320 and 322 of the small cells 310 and 312, respectively, can synchronize with the grandmaster clock 324, which is synchronized with the timing reference provided by the GPS signal via the GPS receiver 328.

Figure 4:
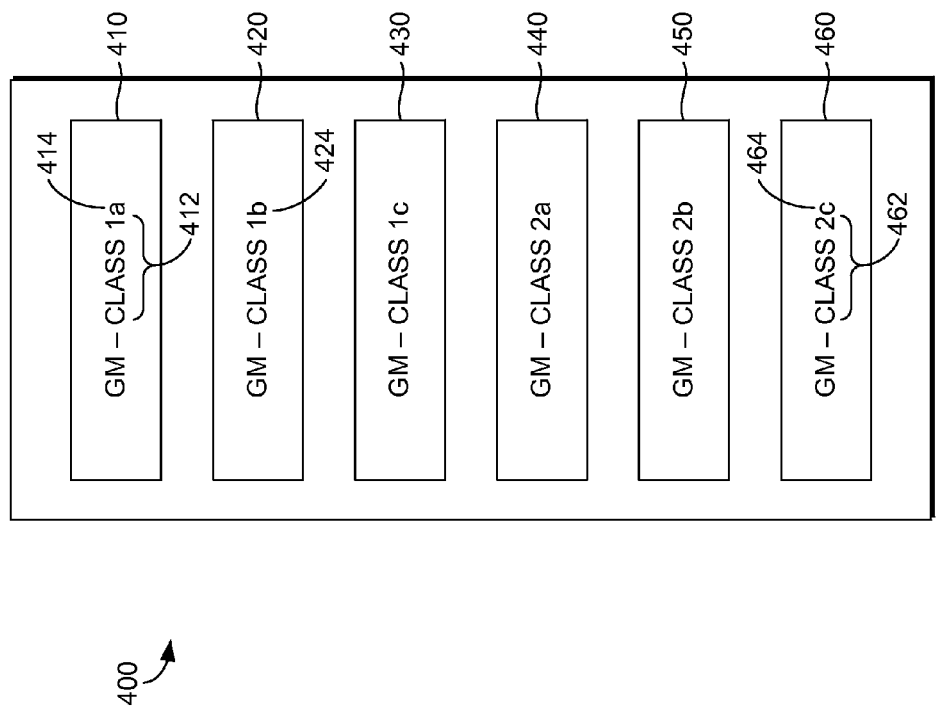
FIG. 4 depicts a predetermined preference order of SSIDs, where each SSID corresponds to a wireless communication component associated with a grandmaster timing device, according to an embodiment of the present invention.

Turing now to FIG. 4, a predetermined preference order 400 that may be utilized by a small cell when selecting a grandmaster timing device to connect to is depicted. As discussed above, a grandmaster timing device can have a wireless communication component coupled thereto. In such embodiments, the wireless communication component can include an SSID so that a small cell can locate that grandmaster timing device. The preference order 400 can include at least a list of SSIDs, where each SSID corresponds to a wireless communication component associated with a grandmaster timing device. For example, the preference order 400 can be arranged such that the SSID 410 is the most preferred with decreasing preference going down the list and ending with the SSID 460, which is the least preferred.

In embodiments, the predetermined preference order can include a relative preference level for different types of grandmaster timing devices, as may be indicated by the associated SSID. For instance, in embodiments, the SSID of a wireless communication component coupled to a grandmaster timing device can provide an indication of the configuration of that grandmaster timing device. For example, an SSID can provide an indication of the proximity of the GPS receiver to a grandmaster clock in a grandmaster timing device. As discussed above, a GPS receiver can be communicatively coupled to a grandmaster timing device via a bus, which has a reduced communication latency compared to a grandmaster timing device communicatively coupled to a GPS receiver via a GPS cable connection. Thus, in such embodiments, a grandmaster timing device having a GPS receiver coupled thereto via a bus may be preferred over a grandmaster timing device having a GPS receiver coupled thereto via a GPS cable connection. In the same or alternative embodiments, an SSID of a wireless communication component coupled to a grandmaster timing device can provide an indication of the quality of the grandmaster timing device. For example, in such embodiments, an SSID can provide an indication of the accuracy of the grandmaster clock. As used herein, the accuracy of a grandmaster clock can refer to the stability of a crystal oscillator associated with the grandmaster clock and/or refer to the clock accuracy, clock class, and/or clock variance. In one or more embodiments, the clock accuracy, clock class, and/or clock variance can correspond to the terms and values used in the Best Master Clock Algorithm in the Precision Time Protocol (PTP) IEEE-1588v2 standard.

In embodiments where SSIDs provide an indication of the configuration and/or quality of grandmaster timing devices, the SSIDs can include a standard naming convention, such as that illustrated with the SSIDs 410, 420, 430, 440, 450, and 460 of the preference order 400. It should be understood that the standard naming convention depicted in the preference order 400 of FIG. 4 and further discussed below is only exemplary and any naming convention may be used to denote the configuration and/or quality of grandmaster timing devices.

As depicted in the preference order 400 of FIG. 4, the SSIDs 410, 420, 430, 440, 450, and 460 provide both an indication of the configuration and the quality of the associated grandmaster timing device. For example, the SSID 410 includes a configuration indicator 412, e.g., "CLASS 1," and a quality indicator 414, e.g., "a," while the SSID 460 includes a configuration indicator 462, e.g., "CLASS 2," and a quality indicator 464, e.g., "c." In certain embodiments, the "CLASS 1" configuration indicator, e.g., the configuration indicator 412, can be utilized to denote a grandmaster timing device having a GPS receiver communicatively coupled thereto via a bus, while the "CLASS 2" configuration indicator, e.g., the configuration indicator 462, can be utilized to denote a grandmaster timing device having a GPS receiver communicatively coupled thereto via a GPS cable connection.

In one or more embodiments, the quality indicator "a," e.g., the quality indicator 414, may indicate that the grandmaster timing device associated with the SSID 410: has a highly stable crystal oscillator compared to other crystal oscillators that are commercially available; has a highly accurate grandmaster clock compared to other grandmaster clocks that are commercially available; is designated with a specific clock class; and/or has a lower level of variability associated with the grandmaster clock compared to other grandmaster clocks that are commercially available.

In certain embodiments, the quality indicator "c," e.g., the quality indicator 464, may indicate that the grandmaster timing device associated with the SSID 460: has a reduced stability crystal oscillator compared to other crystal oscillators that are commercially available; has a reduced accuracy grandmaster clock compared to other grandmaster clocks that are commercially available; is designated with a specific clock class; and/or has an increased level of variability associated with the grandmaster clock compared to other grandmaster clocks that are commercially available.

In embodiments, the quality indicator "b," e.g., the quality indicator 424, may indicate that the grandmaster timing device associated with the SSID 420: has a moderately stable crystal oscillator compared to other crystal oscillators that are commercially available; has a moderately accurate grandmaster clock compared to other grandmaster clocks that are commercially available; is designated with a specific clock class; and/or has a moderate level of variability associated with the grandmaster clock compared to other grandmaster clocks that are commercially available.

As discussed below with reference to FIG. 5, a small cell can compare any identified grandmaster timing devices to the predetermined preference order 400 to select the most preferred grandmaster timing device for time synchronization.

Figure 5:
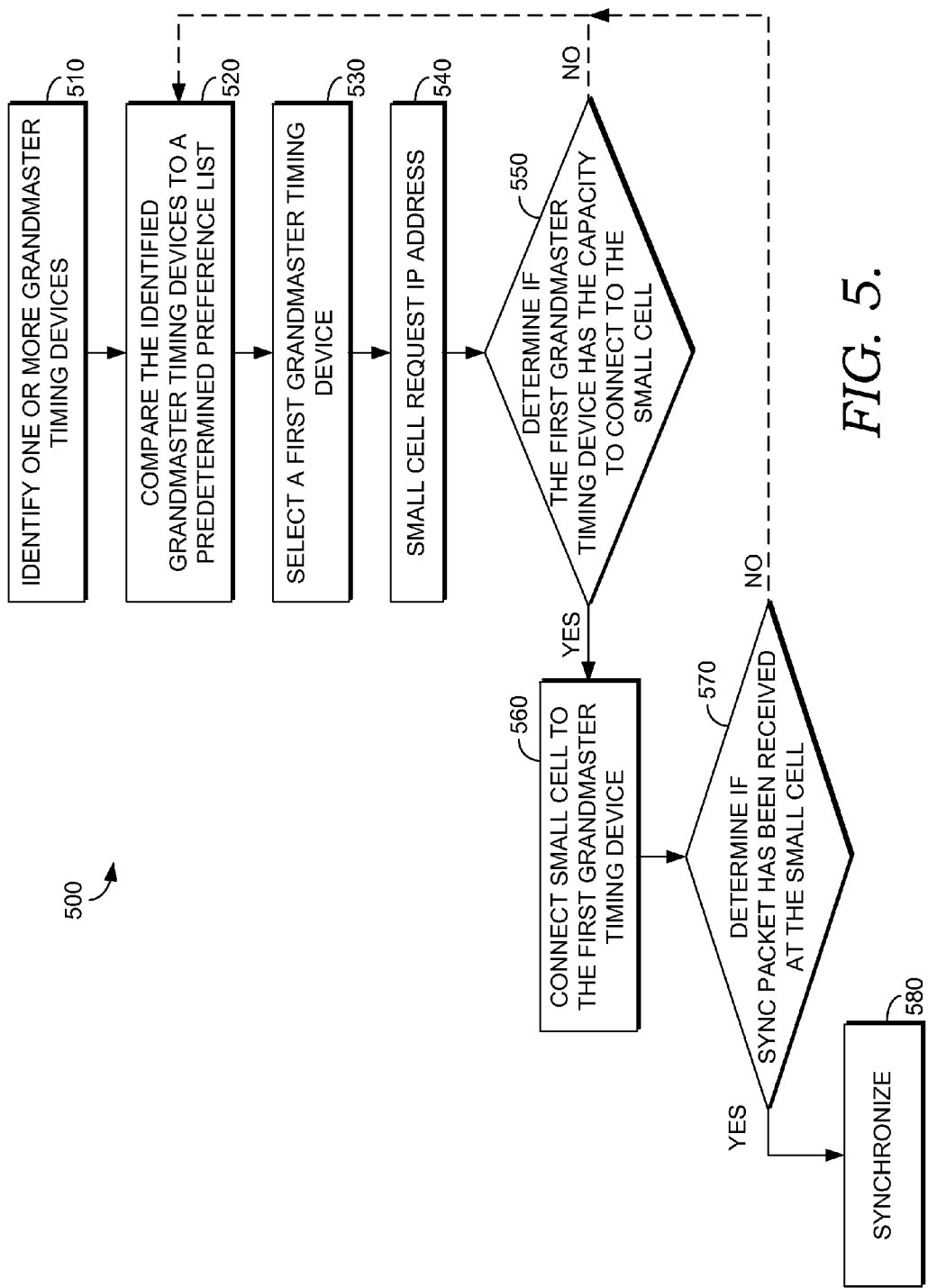
FIG. 5 depicts a flow diagram of an exemplary method for wirelessly connecting a small cell to a grandmaster timing device, according to one embodiment of the present invention.

Turning now to FIG. 5, an exemplary method 500 for wirelessly connecting a small cell to a grandmaster timing device is depicted. The small cell can have any or all of the properties and parameters of the small cells 210, 212, 310, and 312 discussed above with reference to FIGS. 2 and 3. The grandmaster timing device can embody any or all the properties and parameters of the grandmaster timing devices 214, 314, and 334 discussed above with reference to FIGS. 2 and 3.

In embodiments, any or all of the grandmaster timing devices located in an area where at least one small cell is deployed may wirelessly broadcast the SSIDs of the wireless communication components coupled thereto. In such embodiments, the step 510 of identifying one or more grandmaster timing devices can include detecting, at the small cell, the broadcasted SSIDs associated with the wireless communication components of the grandmaster timing devices. In certain embodiments, one or more of the wireless communication components of one or more grandmaster timing devices may not broadcast an SSID. In such embodiments, the small cell can still perform the step 510 of identifying one or more grandmaster timing devices, since the SSIDs may be preprogrammed into the small cell.

In step 520, the small cell can compare the identified grandmaster timing devices to a predetermined preference order, such as the predetermined preference order 400 discussed above with reference to FIG. 4. In certain embodiments, the predetermined preference order can be stored in memory in the small cell. In embodiments, the step 520 can include comparing the SSIDs identified in step 510 to a predetermined preference order by determining which of the identified SSIDs has the highest preference based on the predetermined preference order.

Once the small cell has compared the identified SSIDs to a predetermined preference order, in step 530, the small cell can select a first grandmaster timing device from the identified grandmaster timing devices. In embodiments, the first grandmaster timing device can be the most preferred grandmaster timing device as determined by step 520.

In certain embodiments, any combination of the steps 510, 520, and 530 may occur simultaneously. For example, any combination of the steps 510, 520, and 530 may occur simultaneously where only one grandmaster timing device is within wireless broadcast range of the small cell.

In step 540, the small cell may transmit a request for an IP address to the first grandmaster timing device selected in step 530. In such embodiments, the step 540 can include the first grandmaster timing device receiving the request for the IP address from the small cell. In embodiments, the small cell can wirelessly transmit a request for an IP address to the first grandmaster timing device.

In step 550, the first grandmaster timing device determines if there is capacity to connect to the small cell. In such embodiments, the first grandmaster timing device may utilize the Dynamic Host Configuration Protocol (DHCP) for determining if the grandmaster timing device has any available IP addresses that the small cell can utilize.

In certain embodiments, where the grandmaster timing device does not have the capacity to connect to the small cell, the small cell may not receive an IP address and may perform step 520 again to compare the identified grandmaster timing devices to the predetermined preference order so that another grandmaster timing device can be selected in step 530 and a request for an IP address can be sent in step 540. In embodiments, the steps 520, 530, and 540 can be repeated until the small cell is connected to a grandmaster timing device. In one or more embodiments, after not being able to connect to a first grandmaster timing device, the small cell may still include that first grandmaster timing device as one of the identified grandmaster timing devices when performing steps 520-540, so that that first grandmaster timing device may be selected again in a subsequent attempt to connect thereto.

In embodiments, where the grandmaster timing device does have capacity to connect to a small cell, in step 560, the small cell is wirelessly connected to the grandmaster timing device. In such embodiments, the grandmaster timing device may transmit an IP address to the small cell to facilitate a connection between the grandmaster timing device and the small cell.

Once the small cell is connected to the first grandmaster timing device, in step 570, the small cell determines if at least one sync packet has been received from the grandmaster timing device. In certain embodiments, in step 570, the small cell may wait for a predetermined period of time for a sync packet to arrive from the first grandmaster timing device. In such embodiments, the predetermined period of time may be at least about 10 nanoseconds, 100 nanoseconds, 1 millisecond, 10 milliseconds, or 100 milliseconds, and/or not more than about 20 second, 10 seconds, 1 second, or 500 milliseconds.

In embodiments where at least one sync packet has been received at the small cell, in step 580, the slave clock of the small cell can synchronize with the grandmaster clock of the first grandmaster timing device. As discussed above, the small cell can receive several packets in order to sync to the GPS timing reference via the grandmaster timing device. In such embodiments, the small cell may receive at least about 1, 2, 4, 8, 16, 32, 64, or 128 packets per second. In certain embodiments, if at any point after connection to the first grandmaster timing device the small cell stops receiving sync packets, the small cell may disconnect from the first grandmaster timing device and/or return to step 510, 520, 530, or 540.

Figure 6:
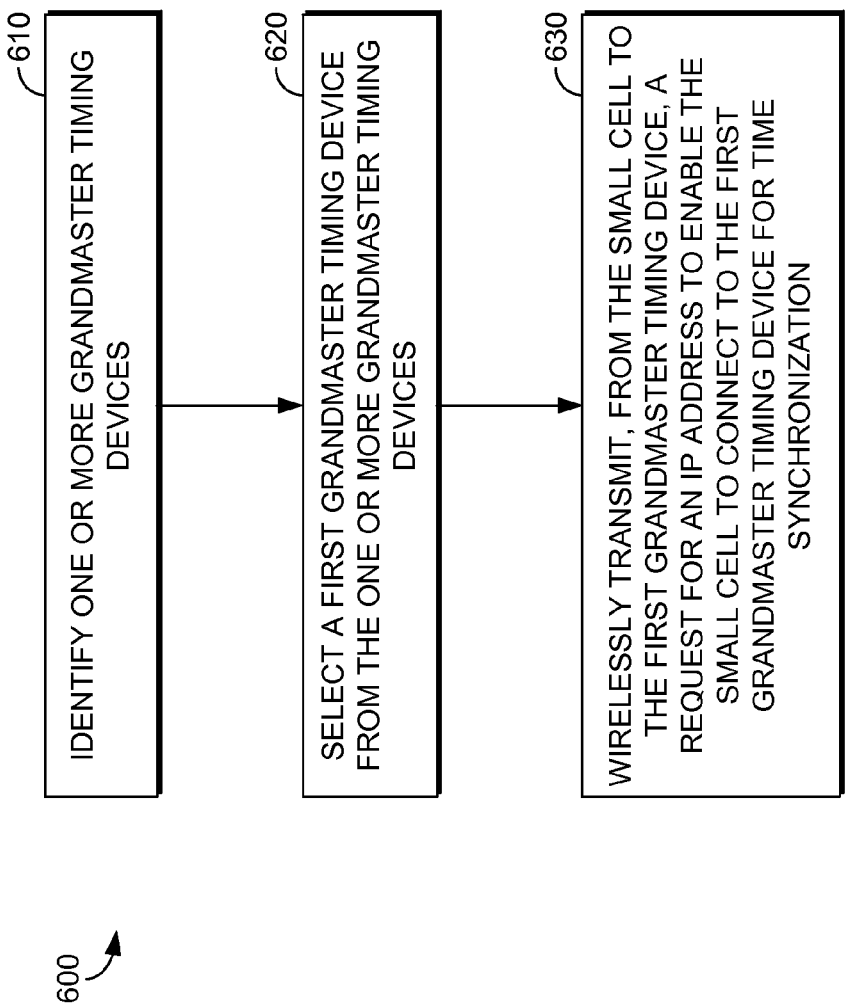
FIG. 6 depicts a flow diagram of an exemplary method for wirelessly connecting a small cell to a grandmaster timing device, according to one embodiment of the present invention.

Turning now to FIG. 6, an exemplary method 600 for wirelessly connecting a small cell to a grandmaster timing device is depicted. The method 600 of FIG. 6 can include a step 610 of identifying one or more grandmaster timing devices. In such embodiments, the grandmaster timing devices can have any or all of the properties and parameters as the grandmaster timing devices 214, 314, and 334 discussed above with reference to FIGS. 2 and 3. For example, each of the grandmaster timing devices may include a grandmaster clock communicatively coupled to a wireless communication component.

In embodiments, the step 610 of identifying one or more grandmaster timing devices can include any or all of the properties and parameters of the step 510 discussed above with reference to the method 500 of FIG. 5. For example, the step 610 can include a small cell identifying an SSID of a wireless communication component that is coupled to a grandmaster timing device. In such embodiments, the small cell can have any or all of the properties and parameters as the small cells 210, 212, 310, and 312 discussed above with reference to FIGS. 2 and 3.

The method 600 of FIG. 6 also includes the step 620 of selecting a first grandmaster timing device from the one or more grandmaster timing devices. In certain embodiments, the step 620 can include any or all of the properties and parameters as the step 530 discussed above with reference to the method 500 of FIG. 5. In one or more embodiments, the step 620 may include comparing the grandmaster timing devices identified in step 610 to a predetermined preference order to identify the most preferred grandmaster timing device.

Step 630 of the method 600 can include wirelessly transmitting, from a small cell to the first grandmaster timing device, a request for an IP address. In such embodiments, the step 630 can include any or all of the properties and parameters of the step 540 discussed above with reference to the method 500 of FIG. 5. In certain embodiments, the small cell requests an IP address from the grandmaster timing device to enable the small cell to connect to the grandmaster timing device for time synchronization. In one or more embodiments, the time synchronization can include transmitting to the small cell PTP sync packets in order to sync a slave clock associated with the small cell to a grandmaster clock associated with the grandmaster timing device. In such embodiments, the small cell may receive at least about 1, 2, 4, 8, 16, 32, 64, or 128 PTP sync packets per second.

Figure 7:
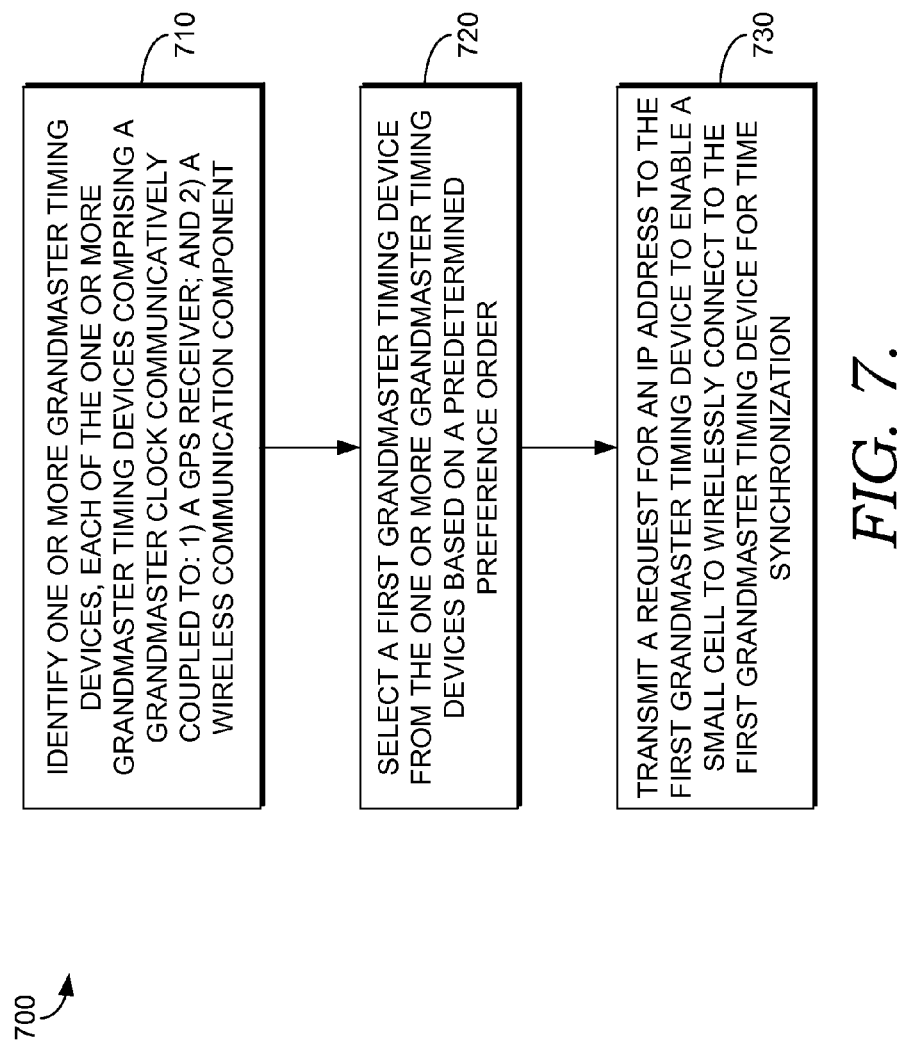
FIG. 7 depicts a flow diagram of an exemplary method for wirelessly connecting a small cell to a grandmaster timing device, according to one embodiment of the present invention.

Turning now to FIG. 7, an exemplary method 700 for wirelessly connecting a small cell to a grandmaster timing device is depicted. The method 700 can include the step 710 of identifying one or more grandmaster timing devices. The grandmaster timing devices can have any or all of the properties and parameters as the grandmaster timing devices 214, 314, and 334 discussed above with reference to FIGS. 2 and 3. For example, each of the grandmaster timing devices may include a grandmaster clock communicatively coupled to a wireless communication component and to a GPS receiver.

In embodiments, the step 710 of identifying one or more grandmaster timing devices can include any or all of the properties and parameters of the step 510 discussed above with reference to the method 500 of FIG. 5. For example, the step 710 can include a small cell identifying an SSID of a wireless communication component associated with the grandmaster timing device. In such embodiments, the small cell can have any or all of the properties and parameters as the small cells 210, 212, 310, and 312 discussed above with reference to FIGS. 2 and 3.

The method 700 can also include the step 720 of selecting, based on a predetermined preference order, a first grandmaster timing device from the one or more grandmaster timing devices identified in step 710. In certain embodiments, the predetermined preference order can include any or all of the properties and parameters as the predetermined preference order 400 discussed above with reference to FIG. 4. For example, in one or more embodiments, the predetermined preference order may be at least partly based on the proximity of a GPS receiver to a grandmaster clock for each of the one or more grandmaster timing devices.

In one or more embodiments, the step 720 can include any or all of the parameters as the step 530 discussed above with reference to the method 500 of FIG. 5. In one or more embodiments, the step 720 may include comparing the SSIDs associated with the grandmaster timing devices identified in step 710 to a predetermined preference order to identify the most preferred grandmaster timing device.

The step 730 of the method 700 includes wirelessly transmitting a request for an IP address to the first grandmaster timing device. In such embodiments, the step 730 can include any or all of the properties and parameters of the step 540 discussed above with reference to the method 500 of FIG. 5. In certain embodiments, the small cell can request an IP address from the first grandmaster timing device to enable the small cell to connect to the grandmaster timing device for time synchronization. In embodiments, the time synchronization can include transmitting to the small cell PTP sync packets in order to sync a slave clock associated with the small cell to the grandmaster clock associated with the grandmaster timing device. In such embodiments, the small cell may receive at least about 1, 2, 4, 8, 16, 32, 64, or 128 packets per second.

Figure 8:
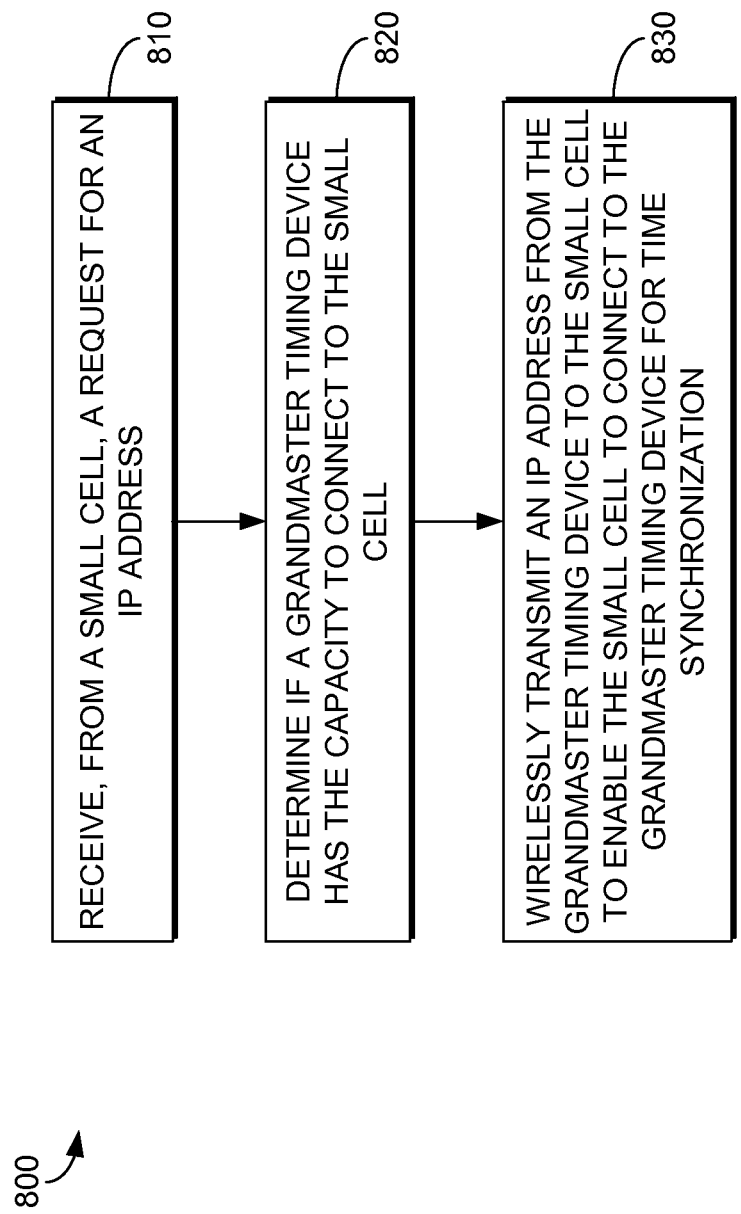
FIG. 8 depicts a flow diagram of an exemplary method for wirelessly connecting a small cell to a grandmaster timing device, according to one embodiment of the present invention.

Turning now to FIG. 8, a method 800 for wirelessly connecting a small cell to a grandmaster timing device is depicted. The method 800 includes the step 810 of receiving, from a small cell, a request for an IP address. The small cell can have the same properties and parameters as the small cells 210, 212, 310, and 312 discussed above with reference to FIGS. 2 and 3. The grandmaster timing device can have the same properties and parameters as the grandmaster timing devices 214, 314, and 334 discussed above with reference to FIGS. 2 and 3.

The method 800 further includes the step 820 of determining if a grandmaster timing device has the capacity to connect to the small cell. In embodiments, the step 820 can have any or all of the properties and parameters as the step 550 discussed above with reference to the method 500 of FIG. 5. For example, in certain embodiments, the grandmaster timing device may utilize a Dynamic Host Configuration Protocol (DHCP) for determining if the grandmaster timing device has any IP addresses available for the small cell to utilize.

In the step 830, the grandmaster timing device wirelessly transmits an IP address to the small cell to enable the small cell to connect to the grandmaster timing device for time synchronization. In certain embodiments, the time synchronization can include transmitting to the small cell PTP sync packets in order to sync a slave clock associated with the small cell to the grandmaster clock associated with the grandmaster timing device. In such embodiments, the small cell may receive at least about 1, 2, 4, 8, 16, 32, 64, or 128 packets per second.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having embodied thereon computer executable instructions that, when executed, perform a method for wirelessly connecting a small cell to a grandmaster timing device, the method comprising:
   identifying one or more grandmaster timing devices, wherein each of the one or more grandmaster timing devices comprises a grandmaster clock communicatively coupled to a wireless communication component;
   selecting a first grandmaster timing device from the one or more grandmaster timing devices;
   wirelessly transmitting, from a small cell to the first grandmaster timing device, a request for an IP address to enable the small cell to wirelessly connect to the first grandmaster timing device for time synchronization; and
   upon determining that the small cell did not receive at least one Precision Time Protocol (PTP) sync packet within a predetermined period of time, selecting a second grandmaster timing device from the one or more grandmaster timing devices.

2. The media according to claim 1, further comprising receiving at least one PTP sync packet from the first grandmaster timing device.

3. The media according to claim 1, further comprising receiving an IP address at the small cell.

4. The media according to claim 1, wherein the first grandmaster timing device comprises a first grandmaster clock and a first GPS receiver communicatively coupled to the first grandmaster clock.

5. The media according to claim 4, wherein the first grandmaster clock is communicatively coupled to the first GPS receiver via a bus.

6. The media according to claim 1, further comprising comparing the one or more grandmaster timing devices to a predetermined preference order, the predetermined preference order comprising a relative preference level for different types of grandmaster timing devices.

7. The media according to claim 6, wherein the predetermined preference order is at least partly based on the proximity of a GPS receiver to a grandmaster clock for each of the grandmaster timing devices.

8. The media according to claim 1, wherein the small cell is positioned inside a building.

9. A method for wirelessly connecting a small cell to a grandmaster timing device, the method comprising:
   identifying one or more grandmaster timing devices, each of the one or more grandmaster timing devices comprising a grandmaster clock communicatively coupled to: 1) a GPS receiver; and 2) a wireless communication component;
   selecting a first grandmaster timing device from the one or more grandmaster timing devices based on a predetermined preference order, the predetermined preference order being at least partly based on the proximity of a GPS receiver to a grandmaster clock for each of the one or more grandmaster timing devices; and
   wirelessly transmitting a request for an IP address to the first grandmaster timing device to enable a small cell to wirelessly connect to the first grandmaster timing device for time synchronization.

10. The method according to claim 9, wherein each wireless communication component of each of the one or more grandmaster timing devices comprises an SSID, wherein the SSID for each wireless communication component provides an indication of the proximity of a GPS receiver to a grandmaster clock for each of the one or more grandmaster timing devices.

11. The method according to claim 9, wherein the first grandmaster timing device comprises a first grandmaster clock and a first GPS receiver coupled to the first grandmaster clock via a bus.

12. The method according to claim 11, wherein a second grandmaster timing device of the one or more grandmaster timing devices comprises a second GPS receiver and a second grandmaster clock communicatively coupled to the second GPS receiver via a GPS cable, and wherein, based on the predetermined preference order, the first grandmaster timing device is preferred over the second grandmaster timing device.

13. The method according to claim 9, wherein the predetermined preference order is at least partly based on the accuracy of each grandmaster clock for each of the one or more grandmaster timing devices.

14. One or more non-transitory computer-readable media having embodied thereon computer executable instructions that, when executed, perform a method of wirelessly connecting a small cell to a grandmaster timing device, the method comprising:
   receiving, at a grandmaster timing device, a request, from a small cell, for an IP address, wherein the grandmaster timing device was selected from one or more grandmaster timing devices for receiving the request based on a predetermined preference order, the predetermined preference order being at least partly based on the proximity of a GPS receiver to a grandmaster clock for each of the one or more grandmaster timing devices;
   determining, at the grandmaster timing device, if the grandmaster timing device has capacity to connect to the small cell; and
   wirelessly transmitting an IP address from the grandmaster timing device to the small cell to enable the small cell to wirelessly connect to the grandmaster timing device for time synchronization.

15. The media according to claim 14, further comprising transmitting at least one PTP sync packet to the small cell.

16. The media according to claim 14, wherein the grandmaster timing device comprises a grandmaster clock communicatively coupled to: 1) a GPS receiver; and 2) a wireless communication component.

17. The media according to claim 16, wherein the wireless communication component comprises an SSID.

18. The media according to claim 17, wherein the SSID provides an indication of the proximity of the GPS receiver to the grandmaster clock.

19. The media according to claim 17, wherein the grandmaster timing device does not wirelessly broadcast the SSID.

* * * * *